Patented Aug. 12, 1941

2,252,081

UNITED STATES PATENT OFFICE 2,252,081

PREPARATION OF SULPHONIUM COMPOUNDS

Eugene Lieber, Cranford, N. J., assignor to Standard Oil Development Company, a corporation of Delaware No Drawing. Application September 17, 1938, Serial No. 230,387

4 Claims. (Cl. 260—607)

This invention relates to an improved process for the preparation of sulphonium compounds, more particularly to the preparation of sulphonium chlorides and the sulphonium bases formed therefrom by hydrolysis.

It has been found that organic sulphides react readily with alkyl chlorides to form sulphonium chlorides. The reaction is indicated by the following equation: $RSR' + R''Cl = RR'R''SCl$.

In the above equation R and R' represent organic radicals, both alkyl and aryl, of which at least one is preferably alkyl; and R'' represents an alkyl radical.

The resulting sulphonium chloride is then hydrolyzed to a sulphonium base, as indicated by the following equation:

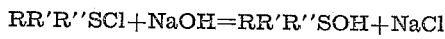

$RR'R''SCl + NaOH = RR'R''SOH + NaCl$

The first reaction for the preparation of the sulphonium chloride is advantageously conducted in an inert anhydrous organic solvent. When it is intended that the sulphonium halide product be hydrolyzed directly, this solvent is preferably one in which the hydrolyzing agent, such as an alkali, is soluble and in which the resulting halide, such as sodium chloride or potassium chloride, is insoluble. Such suitable solvents include the anhydrous alcohols, particularly methyl alcohol, ethyl alcohol, and isopropyl alcohol.

One suitable method for preparing sulphonium compounds according to the process of this invention is presented in the following example:

A solution of four molecular proportions by weight of ethyl thio-ether in absolute methyl alcohol was saturated with one molecular proportion of methyl chloride at room temperature and pressure. The solution was sealed in a pressure bomb and allowed to stand for 24 hours. The resulting solution, containing methyl diethyl sulphonium chloride, was then agitated with a saturated solution of sodium hydroxide in absolute methyl alcohol, sodium chloride being precipitated with the formation of di-ethyl methyl sulphonium hydroxide. The sodium chloride was removed by filtration and the mixture was then distilled on a water bath (80–90° C.) at an absolute pressure of 20 to 30 mm. of mercury to separate the sulphonium base from the solvent and unreacted materials which were withdrawn as distillate. The yield of diethyl methyl sulphonium hydroxide was 13% based on the methyl chloride. No further purification of the sulphonium base is necessary. Due to its hygroscopic nature it is best handled in solution. It is a white crystalline solid which is extremely hygroscopic, and which decomposes at its boiling point. The sulphonium bases of this invention are soluble in the same solvents which dissolve the strong inorganic bases. The distillate solvent and unreacted materials, preferably after thorough drying, may be further saturated with methyl chloride and the above process repeated.

The process described in the above example may also be conducted with other organic thioethers of which the alkyl thio-ethers are preferred. These include methyl thio-ether, propyl thio-ether, butyl thio-ether, and their isomeric compounds and higher homologs. Mixed thioethers obtained, for example, by passing mercaptans extracted from sour petroleum naphthas with caustic soda, over suitable catalysts such as described in the U. S. Patent No. 2,035,121 to Frolich, may also be used.

Other alkyl chlorides, particularly those in which the alkyl group contains two or more carbon atoms may also be used in place of the methyl chloride in the process described in the above example. These alkyl chlorides include ethyl chloride, isopropyl chloride, the butyl chlorides, and higher alkyl chlorides, such as those obtained by chlorinating paraffin wax, the monochlor derivatives of paraffin wax being preferred.

While the reaction conditions can be varied rather widely from those used in the above example, the reaction is preferably carried out at about room temperature or slightly lower temperatures. The thio-ether may be saturated with alkyl chloride under pressure, and pressures of the order of 5 to 10 atmospheres or even much higher may be obtained in the reaction by the use of inert gases, such as nitrogen. The thioether is preferably used in large excess of the alkyl chloride, although other proportions can be used.

This invention is not to be limited to any specific example or reagents described herein, all of which are presented for purpose of illustration, but is to be limited only by the following claims in which it is desired to claim all novelty.

I claim:

1. Process for the preparation of sulphonium compounds comprising bringing an alkyl thioether and an alkyl chloride into contact in an anhydrous alcohol for a time sufficient to form a tri-alkyl sulphonium chloride, adding a solution of an alkali in an anhydrous alcohol to the resulting reaction mixture and hydrolyzing the said sulphonium chloride to form a tri-alkyl sulphonium hydroxide.

2. Process according to claim 1 in which said anhydrous alcohol is methyl alcohol.

3. Process according to claim 1 in which the said tri-alkyl sulphonium hydroxide is separated as residue by distillation and the distillate is dehydrated and returned to the first-mentioned reaction.

4. Process for preparing a sulphonium base comprising saturating a solution of ethyl thioether in absolute methyl alcohol with methyl chloride and allowing the solution to stand until tri-ethyl methyl sulphonium chloride is formed, then agitating the resulting mixture with a solution of sodium hydroxide in methyl alcohol and separating the resulting tri-ethyl methyl sulphonium hydroxide from the reaction products.

EUGENE LIEBER.